United States Patent [19]
Beekhuis et al.

[11] 3,821,274
[45] June 28, 1974

[54] PROCESS FOR PREPARING 2-(β-CYANOETHYL)-N-SUBSTITUTED ACETALDIMINES

[75] Inventors: Gerrit E. Beekhuis, Geleen; Joseph F. M. Klein, Bunde, both of Netherlands

[73] Assignee: Stamicarbon N.V., Heerlen, Netherlands

[22] Filed: Feb. 8, 1972

[21] Appl. No.: 224,615

[30] Foreign Application Priority Data
Feb. 18, 1971 Netherlands.......................... 712136

[52] U.S. Cl. ........................ 260/464, 260/465.5 R
[51] Int. Cl. .......................................... C07c 121/02
[58] Field of Search ..................... 260/464, 465.5 R

[56] References Cited
UNITED STATES PATENTS
2,768,962  10/1956  Krimm .................. 260/465.5 R X
3,686,262   8/1972  Groen et al. ................ 260/465.1

Primary Examiner—Joseph P. Brust
Attorney, Agent, or Firm—Cushman, Darby & Cushman

[57] ABSTRACT

A process for preparing 2-(β-cyanoethyl)-N-substituted acetaldimines by the reaction of acrylonitrile and an N-substituted acetaldimine is disclosed, wherein the reaction is conducted in the presence of at least one compound which is an alkali metal oxide, an alkaline-earth metal oxide, an alkali metal hydroxide, an alkaline-earth metal hydroxide, an alkali metal salt or an alkaline-earth metal salt derived from an acid having a dissociation constant less than $10^{-5}$.

3 Claims, No Drawings

PROCESS FOR PREPARING 2-(β-CYANOETHYL)-N-SUBSTITUTED ACETALDIMINES

BACKGROUND OF THE INVENTION

U.S. Pat. No. 2,768,962 discloses the reaction of an N-substituted acetaldimine with acrylonitrile at elevated temperatures (e.g. 70°–200° C), with hydrogen atoms of the methyl group of the acetaldimine being replaced by a β-cyanoethyl group. For replacement of one hydrogen atom by a β-cyanoethyl group to form 2-(β-cyanoethyl)-N-substituted acetaldimines, this reaction can be conducted in the method described in copending U.S. patent application Ser. No. 8,703, filed Feb. 4, 1970, which also discloses the starting materials for such reaction.

However, it has been found that the reaction of acrylonitrile with an N-substituted acetaldimine produces, as a by-product, the corresponding N-substituted crotonaldimine, together with the desired cyanoethylated product. For instance, in the reaction of N-cyclohexylacetaldimine with acrylonitrile, N-cyclohexyl-crotonaldimine is produced as a by-product. This crotonaldimine may be a valuable by-product but obviously the co-production of such by-product increases the cost of the desired 2-(β-cyanoethyl)-N-substituted acetaldimine product.

SUMMARY OF THE INVENTION

The process of the present invention involves the liquid-phase reaction of acrylonitrile with an N-substituted acetaldimine, with substantial reduction in the formation of N-substituted crotonaldimines. The process of the invention involves conducting the aforesaid reaction in the presence of at least one compound which is an alkali metal oxide, an alkaline-earth metal oxide, an alkali metal hydroxide, an alkaline-earth metal hydroxide, an alkali metal salt or an alkaline-earth metal salt derived from an acid having a dissociation constant less than $10^{-5}$.

DESCRIPTION OF THE INVENTION

The co-production of by-product N-substituted crotonaldimine is substantially reduced in the liquid phase reaction of acrylonitrile with an N-substituted acetaldimine if the reaction is carried out in the presence of at least one compound selected from the group consisting of alkali metal oxides, alkaline-earth metal oxides, alkali metal hydroxides, alkaline-earth metal hydroxides, alkali metal salts of an acid having a dissociation constant less than $10^{-5}$, and alkaline-earth metal salts of an acid having a dissociation constant less than $10^{-5}$. The alkali metals include sodium, potassium, lithium and the like, and the alkaline-earth metals include barium, calcium and magnesium and the like. The alkali metal salts and the alkaline-earth metal salts are derived from acids having dissociation constants less than $10^{-5}$, such as carbonic acid, boric acid, hydrocyanic acid and the like, with carbonic acid being preferred. Mixtures of two or more of the aforesaid compounds can be used if desired.

Examples of compounds that are preferred for limiting the co-production of the crotonaldimines in question are sodium hydroxide, sodium carbonate, potassium hydroxide, potassium carbonate, barium hydroxide and barium carbonate. Further examples of such compounds include sodium oxide, potassium oxide, lithium oxide, calcium oxide, barium oxide, magnesium oxide, lithium hydroxide, calcium hydroxide, magnesium hydroxide, lithium carbonate, calcium carbonate and magnesium carbonate.

The starting N-substituted acetaldimine is an acetaldimine which has an alkyl group containing three to 10 carbon atoms, or a cycloalkyl group of from 4–7 ring carbon atoms, bound to its imine nitrogen atom. Examples of such alkyl substituents include i-propyl, t-butyl and s-butyl, and examples of the cycloalkyl group include cyclobutyl, cyclopentyl, cyclohexyl and cycloheptyl. The cycloalkyl ring may contain substituents upon one or more carbon atoms thereof, such as lower alkyl substituents. The same N-substituents will be found on the 2-(β-cyanoethyl)-N-substituted acetaldimine final product.

The process of the present invention may be conducted using as little as 0.001 to as much as 50, or even more, millimoles of the alkali metal compounds and alkaline-earth metal compounds per mole of acetaldimine. It is preferred that the amount of said compounds be from 0.01 to 10 millimoles per mole of acetaldimine. It is preferred that the reaction of acrylonitrile with the N-substituted acetaldimine be conducted with the use of an acetaldimine which already contains the desired quantity of the alkali metal compound and/or alkaline-earth metal compound, as in practice better process control can then be realized than would be the case if the alkali metal compound and/or the alkaline-earth metal compound was separately supplied to the reaction mixture. The process of the present invention involves a liquid-phase reaction which may be carried out in the absence of a solvent or in the presence of a solvent. If a solvent is used, it is preferred that the solvent be an apolar solvent, as the presence of a polar solvent in the process of the present invention appears to unfavorably affect the acrylonitrile conversion efficiency. Examples of suitable apolar solvents include aromatic, aliphatic and cycloaliphatic hydrocarbons such as toluene, benzene, xylene, pseudocumene and Dekalin. While various combinations of apolar solvents and the alkali metal compounds and/or alkaline-earth metal compounds are possible, it is preferred that the process of the present invention use toluene as the solvent in combination with potassium carbonate and/or sodium carbonate.

In the process of the present invention, the reaction temperature, the molar ratio of acrylonitrile: acetaldimine, and the conversion of the acrylonitrile may be widely varied, with the preferred temperature, molar ratio and conversion of acrylonitrile determined, among other factors, by the desired cyanoethylated product. If the mono-cyanoethylated acetaldimine is desired as the reaction product, it is preferred to use less than 1 mole of acrylonitrile per mole of acetaldimine, more preferably, 0,8 to 0,3 mole of acrylonitrile per mole of acetaldimine and a temperature of between 70° and 200° C. In the process according to the invention, the pressure is not a critical factor and may be varied, e.g., between about 1 and 50 atmospheres. Of course, the pressure employed should be such that at the desired reaction temperature the reaction can be carried out in the liquid phase.

The reaction mixture obtained by the process of the present invention can be separated into its respective components for fractional distillation. In practice, it is preferred to remove at least one fraction by distillation in the presence of an inert solvent which has a boiling point which lies between the boiling points of the fraction to be removed or distilled off, and the residue, or liquid left behind. For instance, pseudocumene or Dekalin permits ready separation of N-cyclohexyl acetaldimine and N-cyclohexyl-γ-cyanobutyraldimine. By the use of such inert solvent, better separation is achieved while, at the same time, the thermal stability of the reaction products is improved by the dilution of the reaction mixture.

EXAMPLES OF THE INVENTION

The invention will be understood more readily by reference to the following examples; however, these examples are intended to illustrate the invention and are not to be construed to limit the scope of the invention.

Example I 1,250 g of N-cyclohexyl acetaldimine, 600 g of toluene and 7 g of sodium carbonate were transferred to a 5-liter flask provided with a stirrer and a reflux cooler. The mixture was heated to 110° C under a nitrogen atmosphere, whereupon, with stirring, 265 g of acrylonitrile (stabilized with 0.5 g of hydrochinone) was added at this temperature in about 5 minutes. The temperature was kept at 110° C for 2 hours, with continuous stirring. Next, at approximately 85° C, 204 g of unconverted acrylonitrile and 268 g of toluene were separated from the reaction mixture by distillation at reduced pressure (350 mm Hg). Subsequently, 900 g of Dekalin were added to the reaction mixture residue, whereupon, by distillation at reduced pressure, the toluene left behind, 10 g of cyclohexylamine (boiling point 71°–73° C at 100 mm Hg), 1,105 g of N-cyclohexyl acetaldimine (boiling point 42°–43° C at 12 mm Hg) and 475 g of Dekalin (boiling point 53°–56° C at 10 mm Hg) were successively removed. After filtration of the residue, 615 g of mixture were recovered which, according to gas chromatographic analysis, contained 1.3 percent by weight of N-cyclohexyl crotonaldimine and 28.7 percent by weight of N-cyclohexyl-γ-cyanobutyraldimine. The efficiency of the process, in terms of the latter compound, was 86.1 percent referred to the acrylonitrile consumed, and 84.8 percent referred to the N-cyclohexyl acetaldimine consumed.

Comparative Example A 1250 g of N-cyclohexyl acetaldimine and 750 g of toluene were transferred to a 5-liter flask provided with a stirrer and a reflux cooler. The mixture was heated to 110° C under a nitrogen atmosphere, whereupon, with stirring, a mixture of 265 g of acrylonitrile and 0.5 g of hydrochinone was added at this temperature in 5 minutes, following which the mixture was kept at 110° C for 2 more hours. Subsequently, 199 g of unconverted acrylonitrile and 240 g of toluene were discharged from the reaction mixture by distillation at approximately 85° C under reduced pressure (350 mm Hg).

Next, 1,000 g of Dekalin were added to the reaction mixture left behind, whereupon, at reduced pressure the toluene present, 41 g of cyclohexylamine (boiling point 71°–73° C at 100 mm Hg), 948 g of N-cyclohexyl acetaldimine (boiling point 42°–43° C at 12 mm Hg) and 407 g of Dekalin (boiling point 53°–56° C at 10 mm Hg) were successively recovered by distillation. 906 g of liquid were left behind, which, according to gas chromatographic analysis, contained 7.8 percent by weight of N-cyclohexyl crotonaldimine and 22.3 percent by weight of N-cyclohexyl-γ-cyanobutyraldimine. The efficiency of the process in terms of the latter compound was 91 percent, referred to the acrylonitrile consumed, and 47 percent, referred to the N-cyclohexyl acetaldimine consumed.

Example II

A solution of 1,250 g of N-cyclohexyl acetaldimine in 950 g of benzene was intensively mixed for 1 hour at 25° C, under a nitrogen atmosphere, with a solution of 10 g of sodium hydroxide in 10 g of water. After the aqueous layer was separated off, the solution of N-cyclohexyl acetaldimine was dried by means of azeotropic distillation at atmospheric pressure, with resulting discharge of about 250 g of benzene.

The sodium content of the dried solution of N-cyclohexyl acetaldimine was 20 parts by weight per million. The solution of N-cyclohexyl acetaldimine in benzene so pretreated was heated under a nitrogen atmosphere to 100°–103° C in a 5-liter flask provided with a stirrer and a reflux cooler, whereupon, with stirring, 265 g of acrylonitrile (stabilized with 0.5 g of hydrochinone) was added in 10 minutes' time, following which the stirring was continued for 3 more hours at a temperature of 100°–103° C. Next, the unconverted acrylonitrile (213 g) and part of the benzene were removed by distillation at about 85° C, and atmospheric pressure.

After 900 g of pseudocumene were added to the remaining reaction mixture, the benzene still present, 9 g of cyclohexylamine, 1,122 g of N-cyclohexyl acetaldimine and part of the pseudocumene were removed by distillation at reduced pressure, 528 g of solution remained, which contained 0.8 percent by weight of N-cyclohexyl crotonaldimine and 30.4 percent by weight of N-cyclohexyl-γ-cyanobutyraldimine. The efficiency of the process, in terms of the latter compound, was 92 percent referred to the acrylonitrile consumed, and 88 percent referred to the N-cyclohexyl acetaldimine consumed.

Example III 1,600 g of toluene were transferred to a 5-liter flask provided with a stirrer and a reflux cooler. At a temperature of 20°–25° C, 704 g of acetaldehyde were added, under a nitrogen atmosphere in 30 minutes' time. Simultaneously with the acetaldehyde, and also in 30 minutes' time, 1,584 g of cyclohexylamine were added. Next, the water layer formed (186 g) was separated from the toluene layer. The toluene layer was supplied with 50 g of a solution of sodium hydroxide in water (50 percent by weight). The resulting mixture was intensively stirred for 30 minutes, whereupon the water layer (72 g) was separated off. After azeotropic distillation of the toluene layer at atmospheric pressure, during which 608 g of distillate were obtained, 3,050 g of solution were left behind. The solution obtained, which contained 63.6 percent by weight of N-cyclohexyl acetaldimine and 27 parts by weight per million of sodium, was heated to 114° C in a 5-liter flask provided with a stirrer and a reflux cooler, in a nitrogen atmosphere, whereupon 266 g of acrylonitrile were added in about 10 minutes, with stirring. After the mixture had been kept to 114° C for one and a half more hours, the unconverted acrylonitrile (197.7 g) and part of the toluene were removed from the reaction mixture by distillation at approximately 350 mm Hg and about 85° C.

1,000 g of pseudocumene were added to the reaction mixture and the toluene still present, 8 g of cyclohexylamine, 1,768 g of N-cyclohexyl acetaldimine and part of the pseudocumene were removed by distillation at reduced pressure. 587 g of solution were obtained which contained 1.8 percent by weight of N-cyclohexyl crotonaldimine and 34.3 percent by weight of N-cyclohexyl-γ-cyanobutyraldimine. The efficiency of the process, in terms of the latter compound, was 89 percent referred to the acrylonitrile consumed, and 82 percent referred to the N-cyclohexyl acetaldimine consumed.

Example IV 1,188 g of N-tertiary-butyl acetaldimine, 265 g of acrylonitrile, 1 g of hydrochinone and 8 g of barium hydroxide were transferred to a 5-liter autoclave provided with a stirrer. Under a nitrogen atmosphere, the mixture was heated to 90° C and kept at 90° C for 2 hours, with stirring. Next, the autoclave was connected to distillation apparatus and the pressure in the autoclave was slowly reduced to atmospheric pressure, following which, at a temperature of 60° C, 4 g of tertiary butylamine were distilled off. Subsequently, at reduced pressure (450 mm Hg) and again at a temperature of 60° C, a mixture of 1,097 g of unconverted N-tertiary-butyl acetaldimine and 222 g of unconverted acrylonitrile was distilled off (this mixture could be used as such for preparing a subsequent quantity). After filtration of the mixture left behind, 134 g of liquid were obtained. From gas chromatographic analysis and mass-spectrometric examination, it appeared that this liquid contained 5.6 percent by weight of N-tertiary-butyl crotonaldimine and 84.4 percent by weight of N-tertiarybutyl-γ-cyanobutyraldimine. The efficiency of the process in terms of the latter compound was 92 percent referred to the acrylonitrile consumed, and 81 percent referred to the N-tertiary-butyl acetaldimine consumed.

What is claimed is:

1. In a process for preparing 2-(β-cyanoethyl)-N-substituted acetaldimines by the liquid phase reaction of an N-substituted acetaldimine with less than 1 mole of acrylonitrile per mole of said acetaldimine at a temperature of about 70° to about 200° C at a pressure of at least 1 atmosphere, said N-substituents selected from the group consisting of alkyl of 3 – 10 carbon atoms and cycloalkyl of 4 – 7 ring carbon atoms, wherein any substituents on the cycloalkyl ring are lower alkyl substituents, the improvement comprising conducting said reaction in the presence of about 0.001 millimole to about 50 millimoles, per mole of said N-substituted acetaldimine, of at least one compound selected from the group consisting of alkali metal salts of an acid having a dissociation constant less than $10^{-5}$ selected from the group consisting of carbonic acid, boric acid and hydrocyanic acid, and alkaline-earth metal salts of an acid having a dissociation constant less than $10^{-5}$ slected from the group consisting of carbonic acid, boric acid and hydrocyanic acid.

2. In a process for preparing 2-(β-cyanoethyl)-N-substituted acetaldimines by the liquid phase reaction of an N-substituted acetaldimine with less than 1 mole of acrylonitrile per mole of said acetaldimine at a temperature of about 70° to about 200° C at a pressure of at least 1 atmosphere in the presence of an apolar solvent which is toluene, said N-substituents selected from the group consisting of alkyl of 3 – 10 carbon atoms and cycloalkyl of 4 – 7 ring carbon atoms, wherein any substituents on the cycloalkyl ring are lower alkyl substituents, the improvement comprising conducting said reaction in the presence of about 0.001 millimole to about 50 millimoles, per mole of said N-substituted acetaldimine, of potassium carbonate.

3. In a process for preparing 2-(β-cyanoethyl)-N-substituted acetaldimines by the liquid phase reaction of an N-substituted acetaldimine with less than 1 mole of acrylonitrile per mole of said acetaldimine at a temperature of about 70° to about 200° C at a pressure of at least 1 atmosphere in the presence of an apolar solvent which is toluene, said N-substituents selected from the group consisting of alkyl of 3 – 10 carbon atoms and cycloalkyl of 4 – 7 ring carbon atoms, wherein any substituents on the cycloalkyl ring are lower alkyl substituents, the improvement comprising conducting said reaction in the presence of about 0.001 millimole to about 50 millimoles, per mole of said N-substituted acetaldimine, of sodium carbonate.

* * * * *